(12) United States Patent
Zelman

(10) Patent No.: US 7,344,240 B2
(45) Date of Patent: *Mar. 18, 2008

(54) AUXILIARY EYEWEAR ATTACHMENT APPARATUS

(76) Inventor: Gary Martin Zelman, 997 Flower Glen St., Simi Valley, CA (US) 93065

( * ) Notice: Subject to any disclaimer, the term of this patent is extended or adjusted under 35 U.S.C. 154(b) by 0 days.

This patent is subject to a terminal disclaimer.

(21) Appl. No.: 11/337,284

(22) Filed: Jan. 23, 2006

(65) Prior Publication Data

US 2006/0119788 A1 Jun. 8, 2006

Related U.S. Application Data

(63) Continuation of application No. 11/183,603, filed on Jul. 18, 2005, now Pat. No. 7,080,903, which is a continuation of application No. 10/456,086, filed on Jun. 6, 2003, now Pat. No. 6,918,667, which is a continuation-in-part of application No. 09/184,694, filed on Nov. 2, 1998, now Pat. No. 6,550,913, and a continuation-in-part of application No. 09/483,552, filed on Jan. 14, 2000, now Pat. No. 6,343,858.

(51) Int. Cl.
*G02C 7/08* (2006.01)
(52) U.S. Cl. .......................... 351/57; 351/47
(58) Field of Classification Search ................. 351/41, 351/44, 47, 48, 57, 58
See application file for complete search history.

(56) References Cited

U.S. PATENT DOCUMENTS 6,149,269 A 11/2000 Madison
6,343,858 B1 * 2/2002 Zelman ........................ 351/47
6,550,913 B2 * 4/2003 Zelman ........................ 351/57
6,866,385 B2 3/2005 Madison
6,883,912 B1 4/2005 Madison
6,918,667 B1 * 7/2005 Zelman ........................ 351/57
6,979,081 B2 * 12/2005 Zelman ........................ 351/57
7,080,903 B2 * 7/2006 Zelman ........................ 351/47
2005/0253996 A1 * 11/2005 Zelman ........................ 351/41

OTHER PUBLICATIONS

Manhattan Design Studio, "Takumi Magneti Eyewear" sales catalog (pp. 43-74), (app.) Oct. 1997, New York, New York.

* cited by examiner

*Primary Examiner*—Huy K Mai
(74) *Attorney, Agent, or Firm*—Trojan Law Offices

(57) ABSTRACT

A method and apparatus for mounting auxiliary eyeglasses on conventional eyeglasses in which magnets are attached to temple extensions or temples on the conventional eyeglasses to mate with magnets mounted in appendages of the auxiliary eyeglasses. The magnets on the auxiliary eyeglasses engages the magnets on the conventional eyeglasses from below only, so as to hold the auxiliary frames in place solely by magnetic attractive force. The magnets may be recessed in sockets formed on one side while the magnets may extend out of the sockets on the other side. A wide variety of magnet shapes and configurations are possible.

4 Claims, 3 Drawing Sheets

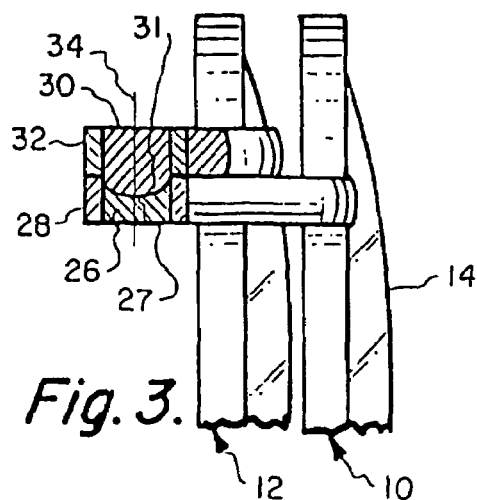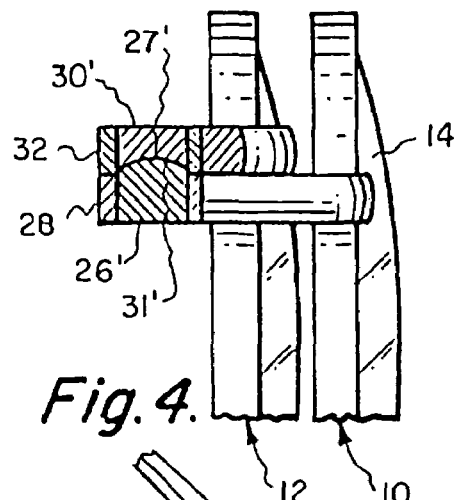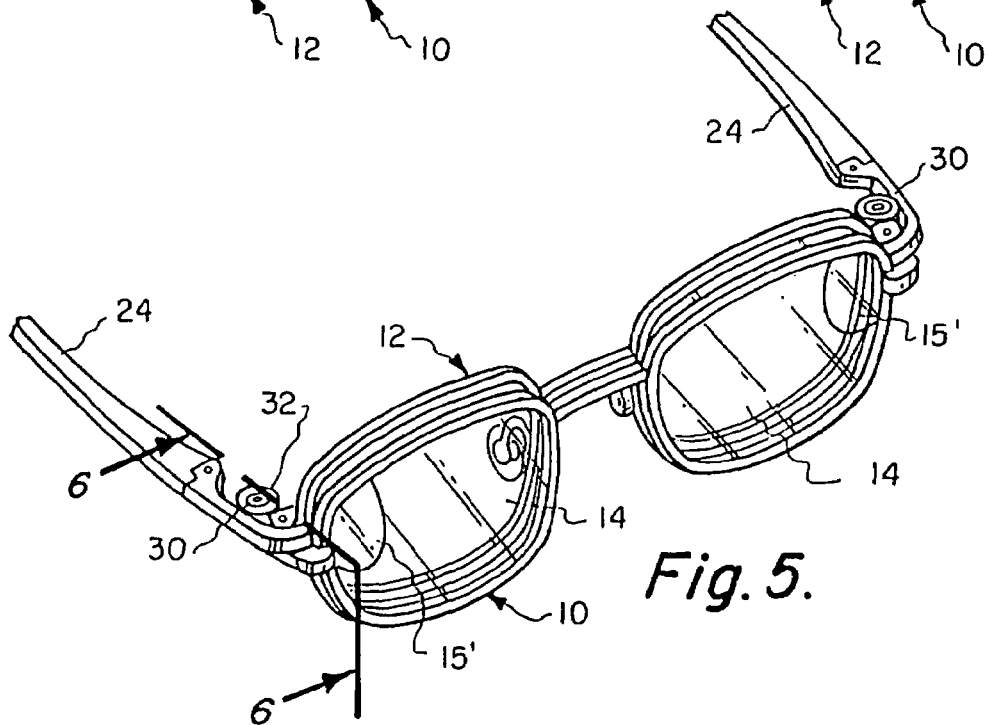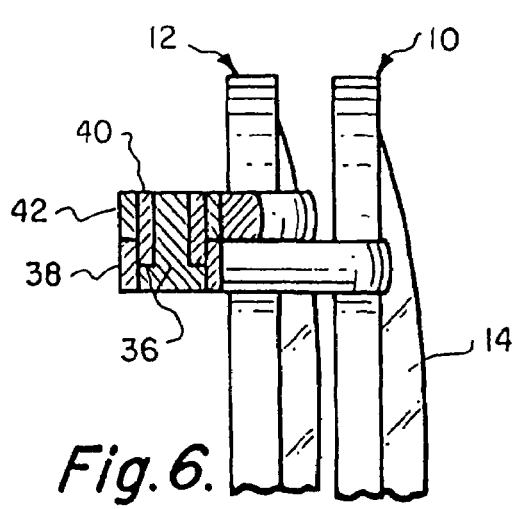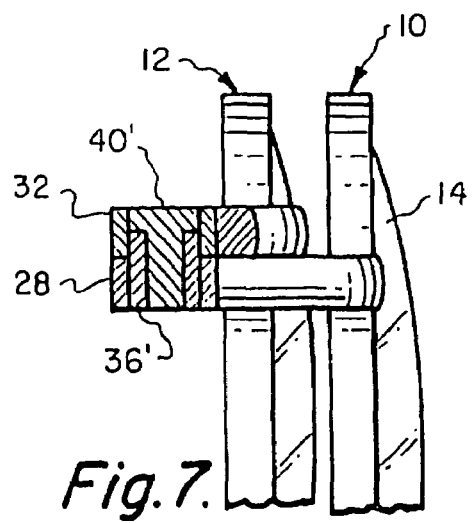

AUXILIARY EYEWEAR ATTACHMENT APPARATUS

CROSS-REFERENCE TO RELATED APPLICATIONS

This application is a Continuation of U.S. Ser. No. 11/183,603, filed Jul. 18, 2005, now U.S. Pat. No. 7,080,903 which is a Continuation of U.S. Ser. No. 10/456,086, filed Jun. 6, 2003, now U.S. Pat. No. 6,918,667 which is a Continuation-In-Part of U.S. Ser. No. 09/184,694, filed Nov. 2, 1998, now U.S. Pat. No. 6,550,913; and Continuation-In-Part of U.S. Ser. No. 09/483,552, filed Jan. 14, 2000, now U.S. Pat. No. 6,343,858.

BACKGROUND OF THE INVENTION

1. Field of the Invention

This invention relates to auxiliary eyewear attachment methods and apparatus, and more particularly, to an auxiliary eyewear for magnetically attaching to conventional eyeglasses.

2. Background Information

Auxiliary eyewear to convert conventional eyeglasses to sunglasses are very popular. They allow the user to usually avoid the need for two separate prescription lenses. They can also be used, but less frequently, to attach auxiliary eyewear that can change the prescription of lenses. The more common use, however, is to add tinted lenses to conventional eyeglasses.

A number of different designs are available for auxiliary eyewear including clip-on eyewear, as well as auxiliary eyewear attachment using magnets. One method of attaching auxiliary eyewear is by clips. A method of attaching auxiliary eyewear by clips is shown and described in U.S. application Ser. No. 08/510,797 filed Aug. 3, 1995 to the same inventor as the invention disclosed herein and incorporated herein by reference. Another patent describing a clip-on type of sunglasses is disclosed and described in U.S. Pat. No. 5,696,571 issued Dec. 9, 1997 to Spencer et al. In these devices auxiliary eyewear is fastened to eyeglasses by a conventional clip system with one clipping engaging the temple while other clips engage the conventional frame.

A newer and very popular method of attaching eyeglasses is by using magnets. One such method is disclosed and described in U.S. Pat. No. 4,070,105 of Meeker. In the Meeker patent the conventional frame includes a magnetic material secured around the peripheral portion facilitating attachment of auxiliary eyeglasses to the conventional eyeglass frame.

Another method of attaching auxiliary eyeglasses using magnets is disclosed in U.S. Pat. No. 5,416,537 of Sadler having magnets secured to temporal portions of a conventional frame that mate with similar magnets in auxiliary eyeglass frames. In the Meeker and Sadler patents, the magnets are embedded in portions of the frames in a vertical orientation for mating with similar magnets in the auxiliary eyeglasses. A problem with this type of arrangement is that the auxiliary eyeglasses are held in place in front of the conventional eyeglasses only by the strength of the magnets. There are no supporting members to prevent the auxiliary eyeglasses from moving vertically relative to the conventional eyeglass frame. Therefore, when the auxiliary eyeglasses are used in some strenuous activity such as jogging or exercising they can slide off and become detached from the conventional frame.

A design that solves this problem by having magnets in auxiliary eyeglass extensions is disclosed and described in U.S. Pat. No. 5,568,207 of Chao. In this patent the problem of the eyeglasses sliding vertically and coming off the conventional eyeglasses is solved by extensions on the auxiliary eyeglasses having magnets that extend over (i.e. above) hinge connections for the temples of the conventional eyeglasses. Magnets in the hinge connections mate with magnets in the extensions to hold the utility eyeglasses in place in front of the conventional eyeglasses. The extensions fitting over (i.e. above) the hinge portions of the conventional eyeglasses prevent the frames from moving downward. It was thought that this combination of the extension being above the temple connection in combination with the magnet prevents the auxiliary eyeglasses from moving downward relative to the conventional eyeglasses and being dislodged during strenuous activity. That is, the patent describes the prior art as being unable to provide a practical solution to attaching auxiliary eyeglasses to conventional eyeglasses with magnets alone.

The problem with the eyeglasses disclosed and described in U.S. Pat. No. 5,568,207 is that the auxiliary eyeglass extensions must be carefully placed above the temple hinge connections. This makes it little more difficult to attach the auxiliary frames to be sure that the extensions are placed carefully above the hinge connections of the conventional eyeglass. In most cases a wearer has to remove his conventional eyeglasses to attach the auxiliary lenses.

It is, therefore, one object of the present invention to provide an improved method and apparatus for attaching auxiliary eyeglasses to conventional eyeglasses.

Another object of the present invention is to provide an improved method and apparatus for attaching auxiliary eyeglasses to conventional eyeglasses with magnets alone without any need for other support.

Yet another object of the present invention is to provide a method of attaching auxiliary eyeglasses to conventional eyeglasses by appendages having magnets that fit below and mate with similar magnets in the conventional eyeglass extensions for attaching eyeglass temples.

Still another object of the present invention is to provide an improved magnetic attachment of auxiliary eyeglasses to conventional eyeglasses with magnets that are oriented to maximize the magnetic force to prevent vertical or downward movement of the auxiliary eyeglasses.

Still another object of the present invention is to provide an auxiliary eyeglass magnetic connection having magnets that are oriented horizontally to maximize the magnetic force in the vertical direction.

Yet another object of the present invention is to provide an auxiliary eyeglass magnetic connection that has magnets mounted in sockets that are slightly recessed to assist in alignment when the auxiliary eyeglasses are mounted on a conventional eyeglass frame.

Still another object of the present invention is to provide auxiliary eyeglasses mounted by magnets that have a variety of shapes and surfaces to assist in alignment and stabilization.

Another object of the present invention is to provide auxiliary eyeglasses that include magnets for attachment to conventional eyeglasses that have mating magnets in which at least one set of magnets are permanent magnets.

Still another object of the present invention is to provide auxiliary eyeglasses mounted by magnets that mate with similar magnets on conventional eyeglasses in which the magnets are in various shapes such as concave/convex spherical; concave/convex conical; cylindrical magnets; or ring-shaped magnets mating with domed magnets.

Yet another object of the present invention is to provide auxiliary eyeglasses that include a reflective coating on an outer peripheral portion to permit a wearer to have a view to the rear.

Still another object of the present invention is to provide an auxiliary eyeglass magnetic attachment that includes additional supporting clips, if desired.

Yet another object of the present invention is to provide auxiliary eyeglass magnetic attachment that includes a clip that conveniently fits over the bridge of conventional eyeglass frame.

BRIEF DESCRIPTION OF THE INVENTION

The purpose of the present invention is to provide an improved auxiliary eyeglass attachment method and apparatus that has a secure attachment by use of magnets that effectively prevents the auxiliary eyeglasses from becoming detached from the conventional eyeglass without a need for additional support.

In the preferred embodiment of the invention the auxiliary eyeglasses are attached to conventional eyeglasses by magnets in a manner that prevents any downward or vertical movement that might cause the auxiliary eyeglasses to become detached. The method of attaching with magnets disclosed herein also provides a much easier method of securing the auxiliary glasses to the conventional eyeglasses as will be described in greater detail hereinafter.

It was thought, for example, as disclosed in the patent of Chao, U.S. Pat. No. 5,568,207, that some support was needed to prevent the auxiliary eyeglasses from "moving downward" and coming off the conventional eyeglasses. However, what was not recognized was that magnets have a very strong attraction in a direction perpendicular to their axis. That is, with very strong magnets it is difficult to separate them by pulling them straight apart. Usually to separate them, particularly when they are very strong magnets, is by sliding them in a direction parallel to their mating surfaces. The reason for this is that the magnetic force is stronger in a direction perpendicular to the surface (i.e. the poles) of the magnets than it is to a direction parallel to the surface. The inventor of the auxiliary eyeglasses disclosed herein discovered that because of this principle correctly oriented magnets can securely hold auxiliary eyeglasses on conventional frames without the need for additional support. The key is to orient the magnets so that any vertical force applied to the auxiliary frames will be perpendicular to the plane of the magnets.

To achieve this unique construction, appendages on opposite sides of the auxiliary frames include sockets for receiving magnets that are oriented with the plane of the magnets horizontal and the axis (i.e. poles) vertical or parallel to the auxiliary eyeglass frame. Complementary mating magnets are mounted in sockets on the hinge extensions on the conventional eyeglasses which are also oriented with the plane of the magnets horizontal and their axis (i.e. poles) vertical or approximately parallel to the plane of the conventional eyeglass.

This arrangement means the auxiliary eyeglasses may be easily mounted on the conventional eyeglasses without any fumbling or searching. The user does not have to feel with his fingers or remove the eyeglasses to be sure that the auxiliary eyeglass appendages are carefully aligned over the temple mounting extensions as with the arrangement described in U.S. Pat. No. 5,568,207 referred to hereinabove. The user can simply place the auxiliary eyeglasses against the conventional eyeglasses with a slight upward motion and they easily attach when the magnets come into close proximity. This arrangement makes for a securely attached auxiliary eyeglasses and frame that is simple and easy to use without the difficulties with the other auxiliary eyeglass designs.

One can easily see the auxiliary eyeglasses approaching the conventional eyeglasses with the appendages on the auxiliary eyeglasses below the temple of the conventional eyeglass frame. Then with a very slight upward movement the magnets attract and the auxiliary eyeglass frame is firmly attached. This can be done simply and easily with one hand without any feeling or fumbling that previous arrangements required. The orientation is nearly automatic and does not require the more careful alignment that is required of other magnetically fastened auxiliary eyeglasses.

An optional but preferred embodiment of the invention includes modification of the sockets for receiving the magnets that are mounted in the appendages in opposite sides of the utility frames and in complementary sockets on temple extensions on the conventional eyeglasses. In this embodiment the magnets in the sockets on either the auxiliary frames or the temple extensions on the conventional eyeglasses are recessed while the magnets in the opposite sockets are slightly extended or raised. This provides a distinct and improved advantage in mating the magnets on the auxiliary frames with the magnets on the temple extensions of the conventional eyeglasses.

The recessed magnets can be constructed in a variety of designs. In the preferred design the magnets are solid cylinders recessed mounted on one side and are extended or raised on the other. Optional constructions include one side where the recessed magnet has a concave shaped surface while the extended or raised magnet can have a convex-shaped surface that mates with the concave surface of the other magnet. Optionally the recessed area of one magnet can be a conical recess while the raised surface of the other magnet can be a cone shape. Still another option is to make one magnet as a hollow cylinder while the other magnet is a solid cylinder having a central raised boss that fits into the interior of the hollow cylindrical or tubular magnet.

The unique and distinct advantage of the invention is the avoidance of scratching the lenses with the appendages for holding the magnet sockets. The reason for this is that the auxiliary eyeglasses are mounted from below. With the recessed sockets a more firm attachment is achieved and alignment of the auxiliary eyeglass frames on the conventional eyeglass frames is almost automatic. One need only press the auxiliary eyeglass lenses against the conventional eyeglass lenses and with a slight upward movement, the raised magnets on one side almost automatically slip into and seat in the recess in the complementary socket. The raised and recessed magnets provide automatic alignment and additional support against horizontal movement of the auxiliary eyeglass.

In addition to the magnets being recessed in sockets to mate with magnets that fit into the recesses, the magnets can come in a variety of designs and forms. The magnets on the auxiliary eyeglasses may be permanent magnets while the magnets on the conventional eyeglass frame may be "soft magnets" (i.e., magnetically attractive material or vice versa). Also the magnets can be in a variety of shapes. For example the magnets can be cylindrical with the magnets on one side having a concave shape while the magnets on the other side have a convex shape matching the concave shape. Also they could be concave/convex spherical or concave/convex conical.

Another shape is ring-shaped magnets on both sides with one side recessed and the other side extendible. Alternately, the magnets could be ring-shaped on one side and cylindrical with a dome that fits inside the cylindrical ring if desired. Many shapes and sizes are possible such as rectangular, square, or triangular although possibly less desirable because they might not be as aesthetically pleasing.

In an optional but less preferred embodiment, clips can provide additional support if desired. This, for example, might be used where very small magnets are used to attach the eyeglasses to the frames. In this embodiment a combination of the clip shown and described in applicant's prior application Ser. No. 08/510,797 filed Aug. 3, 1995 or similar to that shown in the other patents can be attached to the auxiliary eyeglass frame. A clip would be incorporated into the bridge of the auxiliary eyeglass frame that would fit over and engage the conventional eyeglass bridge. This would lock the auxiliary eyeglass frame on the conventional eyeglass frame with the magnets holding the sides in place.

In still another optional but less preferred embodiment, a magnet could be provided beneath the bridge of a conventional eyeglasses to mate with a similar magnet on top of the bridge of the auxiliary eyeglass frame. In this embodiment clips would be attached on top of or in the temple region of the auxiliary eyeglass frame that would fit over and engage the conventional eyeglass frame. In this embodiment the auxiliary eyeglass would be mounted by sliding the clips over the conventional eyeglass frame then pushing down on the bridge so that the magnet on the bridge slides under the bridge of the conventional eyeglass frame mating the magnets. The magnets in the bridge hold the auxiliary eyeglasses onto the frame of the conventional eyeglasses with the clips securely locking it in place.

In an optional embodiment of the invention, a portion of the lenses of the auxiliary eyeglasses is coated with a reflective material to allow a wearer to see to the rear without movement of the head. Where the lenses are substantially rectangular the reflective portion will be provided in approximately a one-forth of an outer portion of the lens adjacent to where the temple attaches. Also optionally the reflective surface could be in an arcuate shape on the lens on an upper outer portion adjacent the temples. Each of these embodiments allows a wearer a limited rearview to either side. This can be helpful to sports persons such as bicycle riders and joggers for example to allow a clear view of traffic approaching or behind them without turning their head away from the path they are on.

The reflective coating would preferably be on one outer peripheral quadrant on the backside of the lenses in the auxiliary eyeglasses. Of course the reflective coating could be on the lenses of the conventional eyeglasses but would be less desirable because it would be more appropriate to use the reflective coating on the auxiliary sunglass lenses. However prescription clear lens with a partial tinting or even with an automatic darkening by exposure to light (i.e., sometimes known as "photogray" lenses) might be possible.

The above and other novel features of the invention will be more fully understood from the following detailed description and the accompanying drawings, in which:

BRIEF DESCRIPTION OF THE DRAWINGS

FIG. 3 illustrates the connection of the auxiliary eyeglass frame by convex recessed spherical magnets embedded in an appendage mating with similar concave extended spherical magnets embedded in the temple extension of a conventional eyeglass frame.

FIG. 4 illustrates an optional embodiment in which a clip formed on the bridge of the auxiliary eyeglass frame fits over and engages the bridge on the conventional eyeglass frame.

FIG. 5 shows the embodiment of FIG. 4 mounted on a conventional eyeglass frame and including a variation of the partial reflective coating illustrated in FIGS. 1 and 2.

FIG. 6 is a sectional view taken at 6-6 of FIG. 5 illustrating the use of tubular magnets.

FIG. 7 is another embodiment in which tubular magnets mate with tubular magnets mounted on a conventional eyeglass frame.

DETAILED DESCRIPTION OF THE INVENTION

The invention disclosed herein is an improvement of the invention disclosed and described in U.S. Pat. No. 6,343,858 by the same inventor as in this application and is incorporated herein by reference.

Figure 1:
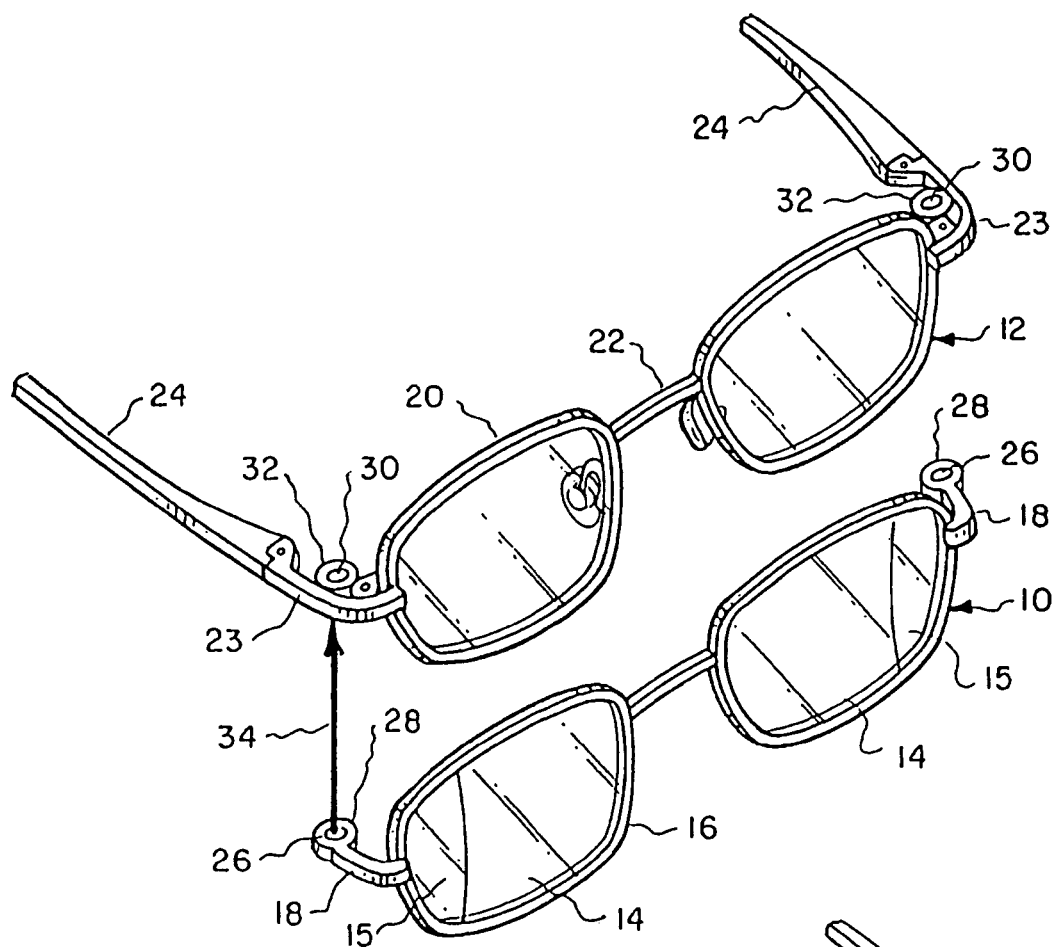
FIG. 1 is an isometric view illustrating the method and apparatus for attaching an auxiliary eyeglass frame to conventional eyeglasses with magnets alone including the use of a partial reflective coating.
Figure 2:
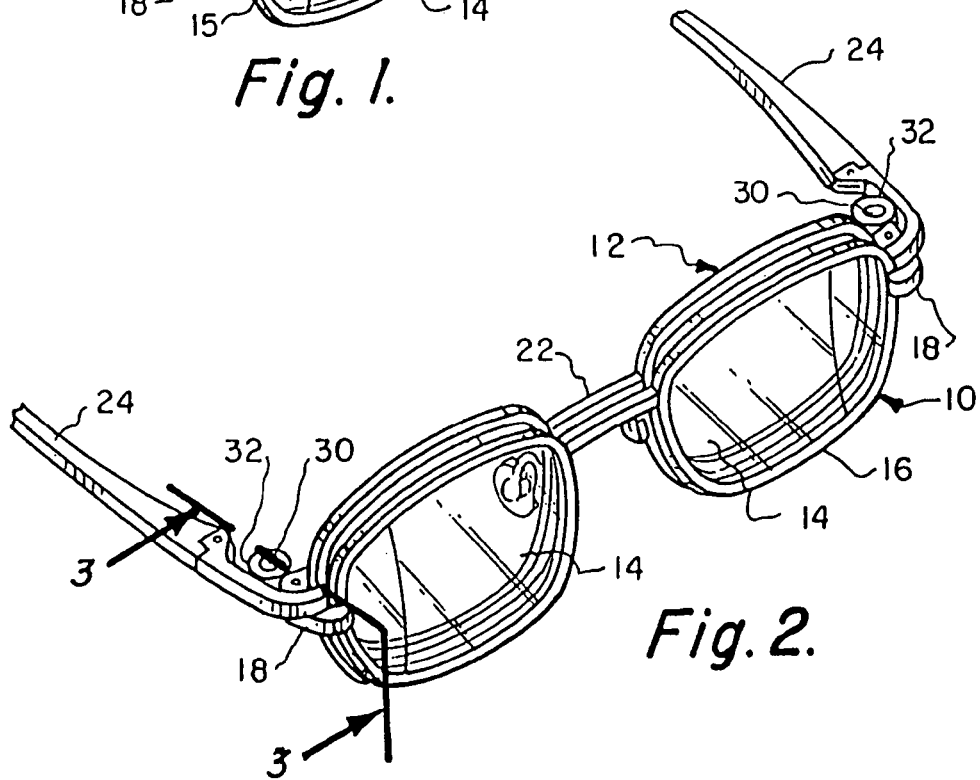
FIG. 2 is an isometric view illustrating the auxiliary eyeglass frame attached to a conventional eyeglass frame with magnets alone.

A unique method and construction for attaching auxiliary eyeglasses 10 to conventional eyeglasses 12 is illustrated in FIGS. 1 through 3. Auxiliary eyeglasses 10 are most commonly tinted eyeglasses to convert conventional eyeglasses 12 to sunglasses but also can have different prescription lenses. Auxiliary eyeglasses 10 have lenses 14 mounted in a frame 16 having appendages 18 extending rearward on either side of frame 16. Conventional eyeglasses 12 have a frame 20 with a bridge 22 with temple extensions 23 on either side of frame 20 for attaching temples 24 to the frames.

In the auxiliary eyeglasses of the prior art magnets are either embedded in frame 20 or in extension on auxiliary eyeglasses that extend over or above the temple extensions 22 of the eyeglass frame 20. With the prior art constructions of magnets embedded in frames 20 the plane of the magnets is vertical or parallel to the lenses facilitating detachment of the auxiliary eyeglasses by a downward shearing force. To solve this problem the auxiliary eyeglasses of U.S. Pat. No. 5,568,207 proposed putting magnets in auxiliary eyeglass extensions that fit over or above the temple mounting extensions on the eyeglass frame. It was thought that some support in addition to the magnets was needed to prevent the auxiliary eyeglasses from becoming detached. While this is a satisfactory solution it is not the best solution. The auxiliary eyeglasses must be carefully positioned above the conventional eyeglass frame to be sure the extensions are above the temples.

The present invention not only provides a solution to the potential detachment or dislodging of auxiliary eyeglass frames 10 but simplifies the method of mounting the auxiliary eyeglass with minimum fuss. This is achieved by inserting magnets 26 in cylindrical sockets 28 in appendages 18 attached to auxiliary eyeglass frame 16. Complementary magnets 30 are mounted in sockets 32 attached to conventional eyeglass frame 20 temple extensions 23. Preferably magnets 26 and 30 are at least four millimeters (4 mm) in diameter.

An important and critical feature of the invention is the orientation of magnets 26 and 30, which is shown more clearly in sectional view of FIG. 3. Generally magnets have plane surfaces and axis. In this case magnets 26 and 30 are shown as cylindrical having an axis 34 that is vertically oriented and is approximately parallel to auxiliary frame 16 and conventional eyeglass frame 20. Magnets in auxiliary eyeglasses 10 have convex spherical shape 27 while magnets 30 have a mating concave spherical shape 31. This means the maximum magnetic attractive force is vertically oriented along axis 34.

Accordingly the maximum magnet force of magnets 26 and 30 is vertically oriented to resist dislodging of auxiliary eyeglass frame 10 by a downward movement. In addition, magnets 26 are slightly recessed in sockets 28 while magnets 30 extend slightly out of sockets 32 to mate with concave spherical magnets 26. It was found that by mounting magnets 26 and 30 approximately 4 mm in diameter having a strong magnetic force vertically oriented is sufficient to hold auxiliary eyeglass frame 10 in place and prevent downward movement. Thus, auxiliary eyeglass frame 10 is securely mounted on conventional eyeglasses 12 and will not easily dislodged by strenuous activity occurring in sports or exercising.

Shearing forces along interface 36 are minimal and would more likely cause conventional eyeglasses 12 to fall off the wearer before auxiliary eyeglasses 10 would be dislodged. This construction not only improves the attachment of auxiliary eyeglasses 10 but also makes it easy for them to be mounted as illustrated in FIG. 2. Auxiliary eyeglasses 10 can merely be brought up to conventional eyeglasses 12 with a slight upward motion until magnet 26 is attracted to magnet 30 and locks in place. Thus, they can easily be oriented and mounted on conventional eyeglasses 12 without the need to remove conventional eyeglasses from the wearer.

A variation is shown in FIG. 4 in which the magnets 26 and 30 are mounted in reverse. That is, magnets 26' in sockets 28 are convex spherical 27' while magnets 30' in sockets 32 are concave spherical 31'. In both FIG. 3 and FIG. 4 embodiments, the cylindrical magnet having the concave spherical surface 30 or 26' extends out of the respective socket 32 or 28 but the reverse would work as well. That is, the cylindrical magnets with the concave spherical surface 26 and 30' would extend out of the respective sockets 28 and 32.

Another optional but preferred feature of the invention is the inclusion of rearward reflecting coating 15 and a portion of the rear side of auxiliary lenses 14. Preferably reflective coating 15 is provided on an outer portion or quadrant of auxiliary lenses 14. Of course the reflective coating could be on the lenses of conventional eyeglass frame 12 but is less desirable because the lenses in the conventional eyeglass frame would generally be clear prescription lenses. Reflective coatings can cover from one-forth to one-third of lenses 15 and provide an effective rear view mirror.

Optionally the reflective coating could be as shown in FIG. 5. In this case, reflective coating 15' would be on only on upper portion of an outer quadrant of lenses 14 covering perhaps fifteen to twenty percent of lenses 14.

To mount the auxiliary eyeglasses 10 of FIGS. 1 through 4, they are placed against the conventional eyeglasses 12 and slid gently upward until concave spherical surface of magnet 26 mates with convex spherical surface of magnet 30 or vice versa with respect to the embodiment of FIG. 4.

Other embodiments utilizing a unique combination of magnets to securely mount auxiliary eyeglasses on conventional eyeglasses are illustrated in FIGS. 6 through 11. These embodiments illustrate the wide variety of shapes and sizes of magnets that may be used for mounting auxiliary eyeglasses 10 on conventional eyeglasses 12. In FIG. 6, magnets having a tubular center post 36 in sockets 38 mate with tubular magnet 40 that extend from sockets 42. Again the arrangement could be reversed if desired. Tubular magnets 36' can extend and tubular magnets 40 could be recessed. This arrangement is illustrated in FIG. 7.

Figure 8:
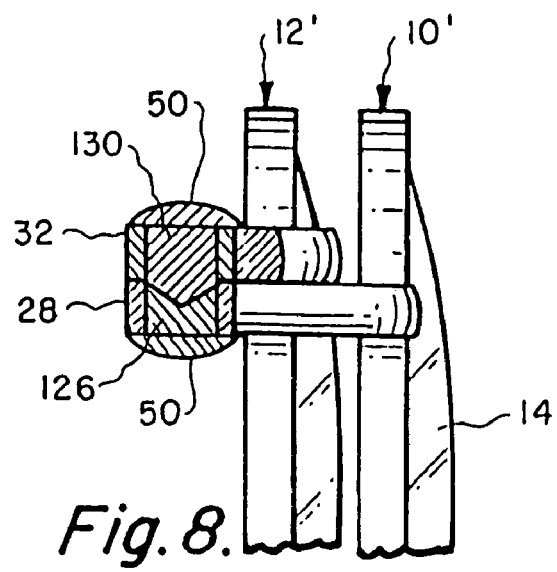
FIG. 8 illustrates a method of mounting the auxiliary eyeglass frame on a conventional eyeglasses using concave/convex conical magnet.
Figure 9:
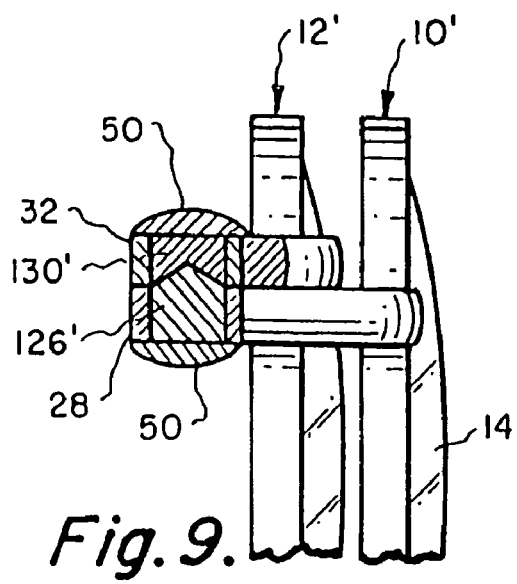
FIG. 9 is similar to the embodiment of FIG. 8 in which the conical/concave magnets are mounted in reverse.

Another alternate but preferred feature of the invention is illustrated in FIGS. 8 and 9. This embodiment not only improves the mounting of auxiliary eyeglasses 10' on conventional eyeglass frames 12' and also improves the aesthetic appearance. This embodiment improves the appearance of the magnets in the conventional eyeglass frame 12' by covering the exposed surface with a protective and decorative coating of material 50 which can be configured to be complementary or exactly match the color and appearance of the conventional eyeglass frames 12'. Thus when auxiliary eyeglass frames 10' are removed from conventional eyeglass frames 12', the magnets in the sockets are not clearly visible. This is not possible with the arrangement in which the magnets mate above the conventional eyeglass frame 12'. When the auxiliary eyeglass frames 10' are removed the magnets would be visible.

The unique and important improvement of using a wide variety of magnets is illustrated in FIGS. 8 and 9. In these embodiments, the further significant improvement described previously is achieved to assure secure attachment and alignment of auxiliary eyeglass frames 10' with conventional eyeglass frames 12'. To assure proper alignment and secure attachment, cylindrical concave conical magnets 126 in sockets 28 are recessed while cylindrical convex magnets 130 in sockets 32 are extended or raised. Thus, when auxiliary frames 10' are pressed against conventional eyeglass frames 12' with a gentle upward movement, alignment is insured by recessed magnets 126 slipping into and seating in recess in auxiliary eyeglass sockets 28 as shown in FIG. 8. Magnets 126 in sockets 28 are covered with a protective and decorative coating material 50 as previously described to improve the aesthetic appearance and conceal the magnets.

Of course, either of sockets 28 or 30 could contain the recessed magnets while the other complementary socket could have the extended or raised magnet, as shown in FIG. 9. Raised convex conical magnets 126' on the auxiliary eyeglass and concave conical magnets 130' on the conventional eyeglass are merely shown to illustrate the construction and arrangement that improves alignment and provides a more secure attachment of auxiliary eyeglass frames 10' on primary or conventional eyeglass frames 12'. The lip or surface of recess in socket 32 provides additional support for the auxiliary eyeglass frames to prevent the auxiliary eyeglass frames from moving in a horizontal direction. The construction and arrangement provides not only a secure and very efficient method of attaching auxiliary eyeglass frames 10' to main or conventional eyeglass frames 12' but provides automatic alignment and makes attachment much easier.

Figure 10:
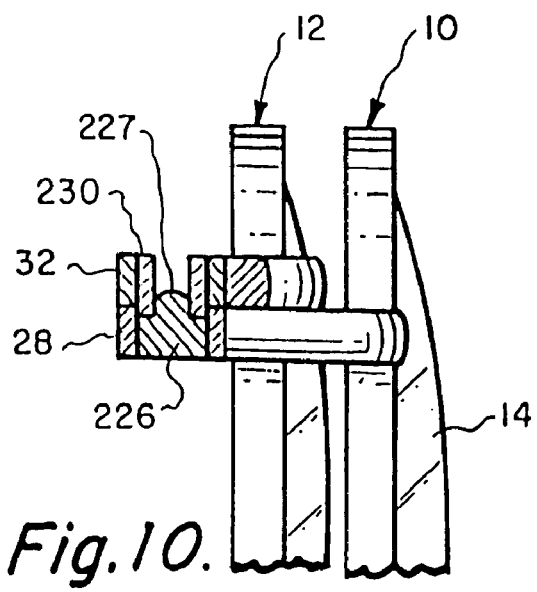
FIG. 10 is a sectional view illustrating a tubular magnet engaging a dome in a cylindrical magnet.
Figure 11:
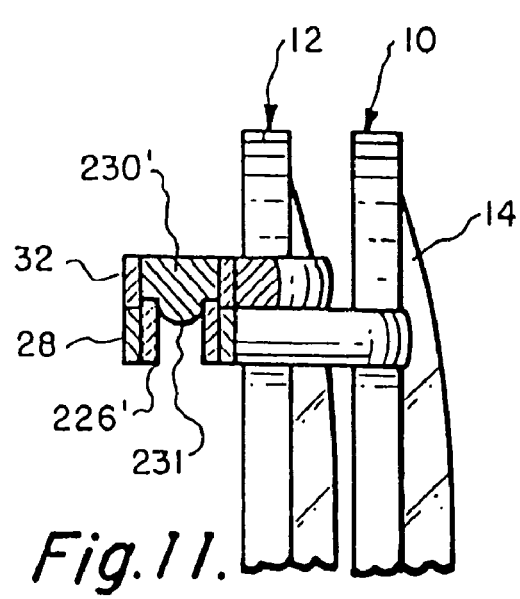
FIG. 11 is a sectional view similar to FIG. 10 with the magnets reversed.

Another embodiment illustrating the wide variety of magnet shapes that may be used is illustrated in FIGS. 10 and 11. In FIG. 10, magnets 226 in sockets 28 are cylindrical and have a dome or boss 227 that fits into the interior of tubular magnets 230 which may extend out of sockets 32. In FIG. 11, the magnets are reversed. Magnets 230' in sockets 32 are cylindrical and have a dome or boss 231, while magnets 226' in sockets 28 are tubular and extend out of the sockets.

These embodiments in FIGS. 3 through 11 illustrate the wide variety of shapes and configurations that are possible. Other shapes such as rectangular, square, oval, or triangular are also possible. Further the magnets may both be permanent magnets or only one side could be permanent magnet while the other is a material known as a "soft" magnet (i.e., a material that can exhibit magnetism). The term "magnet" can mean either.

For most sports activities and exercising the construction disclosed and described herein is sufficient to mount auxiliary eyeglasses 10 on conventional frames 12. The key feature here is the orientation and of magnets 26 and 30 so that the maximum magnetic attractive force along their axis (i.e. poles) 34 is vertically oriented or parallel with conventional eyeglass frame 20. In an optional but preferred embodiment the magnets form a recess in the sockets on either the auxiliary eyeglass frames or the conventional eyeglass frames while the magnets are slightly raised in the complementary sockets. This improves and assists in aligning the auxiliary eyeglass frames on the conventional eyeglass frames and also provides more secure attachment by hindering horizontal movement. In most cases only a substantial shearing force parallel to the interface between magnets 26 and 30 could dislodge auxiliary eyeglasses 10 but then that force would probably dislodge conventional eyeglasses 12 from the head of the wearer.

Thus there have been disclosed novel and unique methods for attaching auxiliary eyeglass to conventional eyeglasses. In one embodiment, magnets having a variety of shapes and orientations such that their maximum magnetic force is vertical or parallel with conventional eyeglass frame are sufficient to hold the auxiliary eyeglasses securely on the conventional eyeglasses.

In another preferred embodiment of a combination of auxiliary eyeglasses includes a partial reflective coating providing rearview mirror for the wearer of the conventional eyeglasses. A reflective coating is provided on an outer quadrant of a rear surface of auxiliary eyeglass lenses.

This invention is not to be limited by the embodiment shown in the drawings and described in the description that is given by way of example and not of limitation, but only in accordance with the scope of the appended claims.

I claim:

1. Eyeglasses comprising:
conventional eyeglasses having a frame portion, said frame portion connected to at least one temple extension, said temple extension connected to a temple;
said temple extension having a first socket, said first socket containing a first member therein;
auxiliary eyeglasses having at least one appendage, said appendage containing a second socket, said second socket containing a second member therein; and,
whereby said second member is capable of magnetically engaging said first member from below only such that said auxiliary eyeglasses are removably secured to and aligned with said conventional eyeglasses.

2. Eyeglasses comprising:
conventional eyeglasses having a frame portion, said frame portion connected to at least one temple extension, said temple extension connected to a temple;
said temple extension having a first socket;
auxiliary eyeglasses having at least one appendage, said appendage containing a second socket;
at least one member contained in either of said sockets and, whereby said member is capable of engaging the socket juxtaposed with said member when said appendage of said auxiliary eyeglasses reaches said temple extension of said conventional eyeglasses from below only such that said auxiliary eyeglasses are removably secured to and aligned with said conventional eyeglasses.

3. The eyeglasses of claim 2 wherein said member is located in said socket of said appendage of said auxiliary eyeglasses.

4. The eyeglasses of claim 2 wherein said member is located in said socket of said temple extension of said conventional eyeglasses.

* * * * *